June 5, 1956  R. C. NELSON  2,748,789
VALVE ASSEMBLY WITH VIBRATION ABSORBING MECHANISM
Filed May 2, 1952  2 Sheets-Sheet 1

RICHARD C. NELSON,
INVENTOR.

BY
ATTORNEY

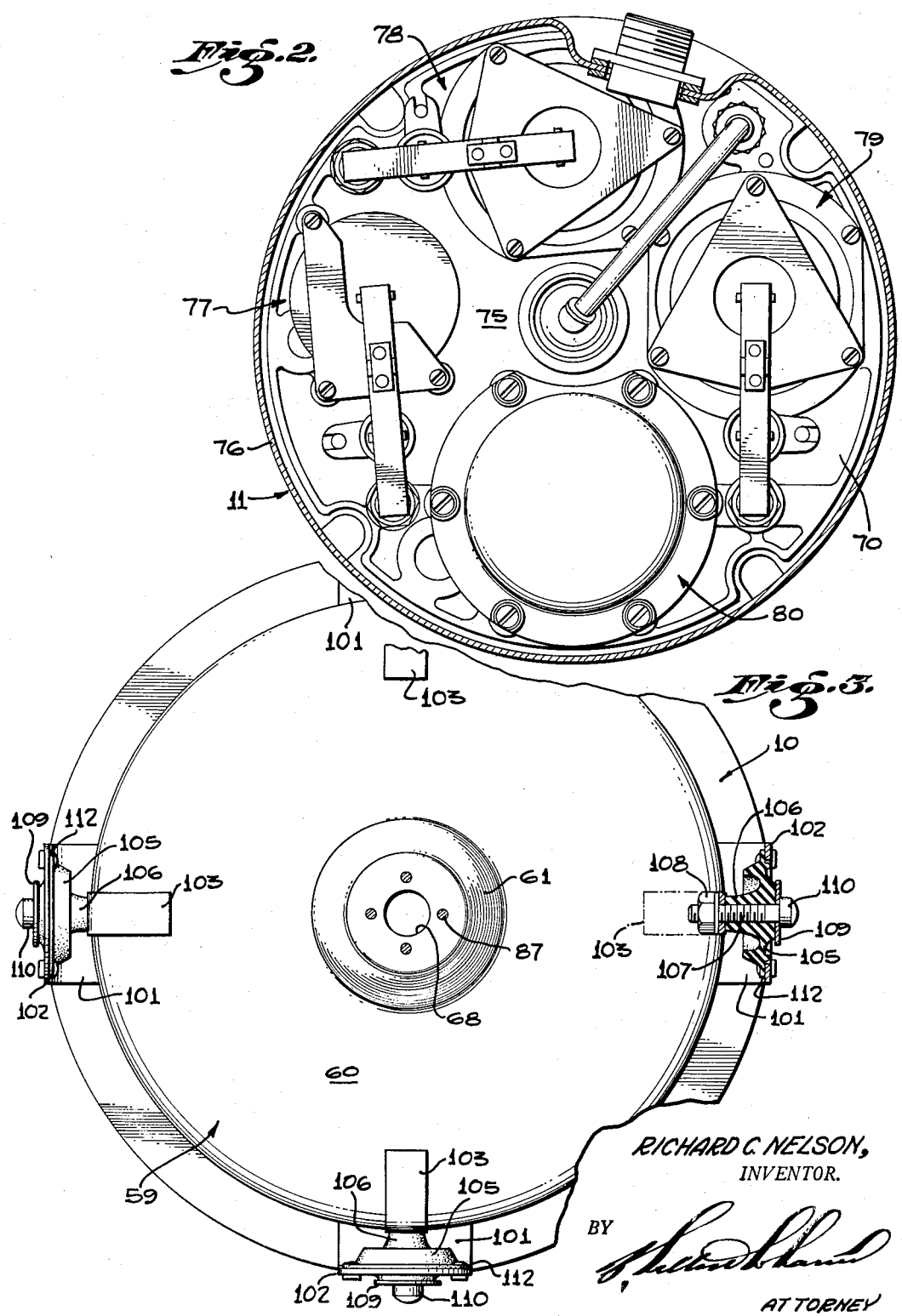

United States Patent Office 2,748,789
Patented June 5, 1956

2,748,789
VALVE ASSEMBLY WITH VIBRATION ABSORBING MECHANISM

Richard C. Nelson, Los Angeles, Calif., assignor to The Garrett Corporation, Los Angeles, Calif., a corporation of California Application May 2, 1952, Serial No. 285,759

7 Claims. (Cl. 137—80)

This invention relates generally to supporting or mounting means and relates more particularly to resilient or shock mounting means.

While the invention has particular utility in connection with the shock or vibration absorbing mounting means for instruments or mechanisms, the operation of which may be adversely effected by shocks or vibrations and will be shown and described in connection therewith, it is understood that said invention is not limited thereto.

Many types of cabin pressure regulators of current design have relatively small and carefully adjusted metering pins in connection with various regulating elements and it has been found that undampened vibrations frequently cause premature movement of these pins and a corresponding change or deviation in the present control schedule and it is an object of the present invention to provide mounting means which will overcome this difficulty.

It is another object of the invention to provide shock absorbing means whereby the regulator mechanism may be directly attached to a rigidly secured outflow valve.

It is still another object of the invention to provide an arrangement of this character having novel connecting means between the regulator mechanism and the outflow valve whereby pressure in the control chamber of the regulator is made available in the operating pressure chamber of the outflow valve.

Another object of the invention is to provide shock or vibration absorbing means of this character that is relatively simple in construction and that is sturdy and effective.

Other objects and advantages of the invention will be apparent from the following part of the specification.

Referring to the drawings, which are for illustrative purposes only:

Fig. 2 is a sectional view taken on line 2—2 of Fig. 1; and

Fig. 3 is a view taken on line 3—3 of Fig. 1.

Figure 1:
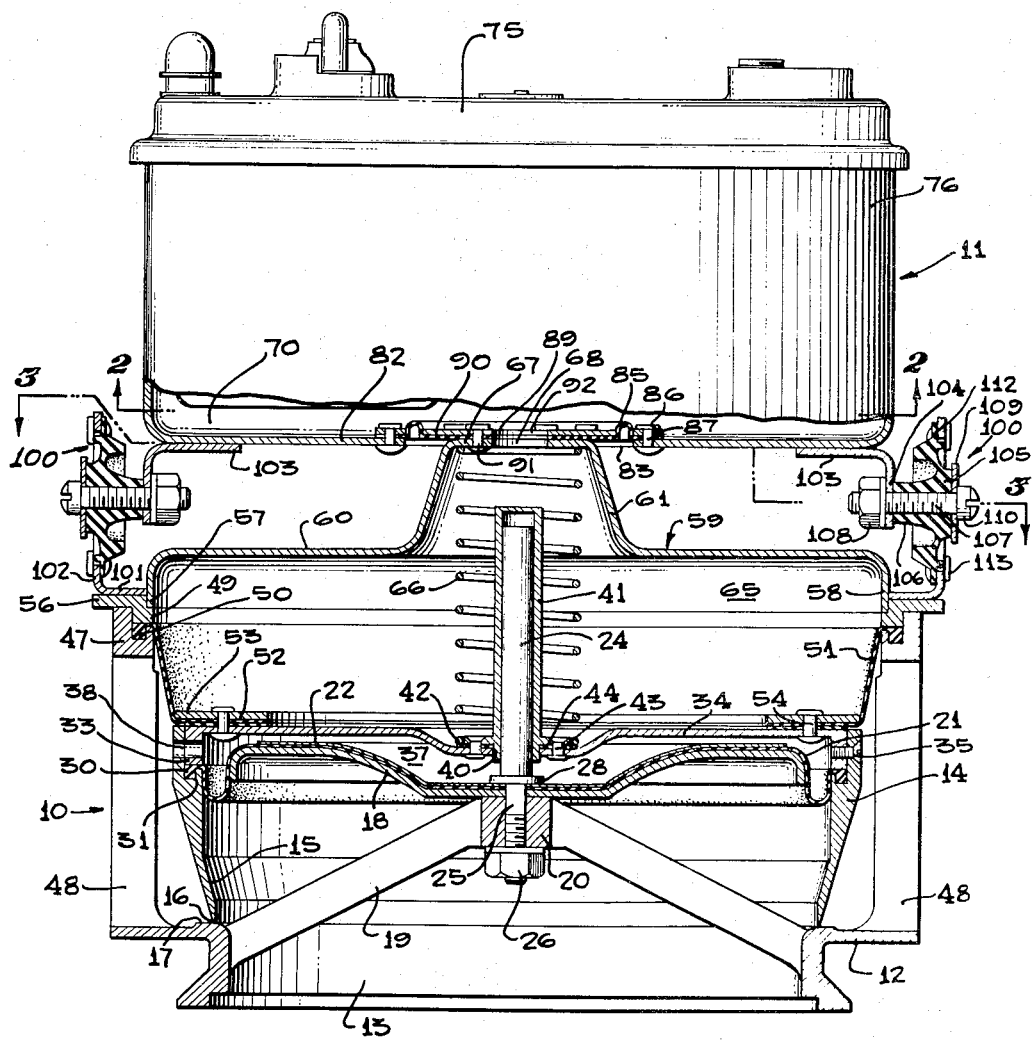
Fig. 1 is a partial sectional view of an outflow valve and regulator mechanism mounted thereto by means embodying the present invention.

Referring more particularly to Fig. 1, there is shown an outflow valve, indicated generally at 10, for an enclosure or aircraft cabin and a regulator mechanism, indicated generally at 11, mounted to the outflow valve by means embodying the present invention.

The outflow valve 10 includes a base 12 having an outflow opening 13 and a movable valve member 14 for controlling the flow of air through said opening 13. The valve member is generally cylindrical and has a frusto-conical portion with an inwardly tapering surface 15 and a relatively sharp edge 16 engageable with a valve seat 17. Disposed within the valve member 14 is a baffle 18 which is smaller than the inside diameter of the upper end (as shown in Fig. 1) of the valve member 14. The baffle is axially arranged with respect to the valve member 14 and is supported by arms 19 of a spider-like arrangement having a central hub 20 with an axial bore therein. Diaphragm 21, for convenience termed the lower diaphragm, connects the baffle with the valve member 14, said diaphragm 21 being disposed on the upper surface of the baffle 18 with a plate 22 disposed on the surface of the diaphragm 21 opposite the baffle 18. It is to be noted that the plate 22 is of generally the same contour as the inner portion of the baffle and that said plate is of smaller diameter than the baffle. There is an upstanding shaft 24 extending axially of the valve member 14. Shaft 24 has a reduced diameter portion 25 at the lower end thereof and said portion 25 extends through the bore in the hub 20 and is provided with a securing nut 26. In order to provide a larger area for engagement with the plate 22, the shaft 24 has an outwardly extending flange 28 from which the reduced portion 25 extends.

Diaphragm 21 is provided with a peripheral bead 30 received in a recess provided therefor in an interior shoulder portion 31 of the valve member 14 and the peripheral portion of the diaphragm 21 is secured in the recess 31 by the depending flange 33 of a cap 34 which is in the shape of a shallow cup. A plurality of annularly spaced screws 35 secure the cap 34 to the valve member 14 and the space 37 between the diaphragm 21 and the plate 22 and the bottom wall of the cap 34 is connected to atmosphere by means of openings 38 in the valve member 14 and flange 33 of the cap 34.

The bottom wall of the cap 34 is provided with an opening 40 arranged axially with respect to the valve member 14 and through which the lower end portion of a sleeve 41 extends, said sleeve being slidably mounted on the shaft 24. Sleeve 41 is provided with an outwardly extending flange 42 adjacent the lower end whereby the sleeve is secured to the bottom of the cap 34 by any suitable means such as rivets 43, there being a sealing gasket 44 disposed between the flange 42 and the bottom wall of the cap 34. Thus shaft 24 provides guide means for the valve member 14. In order to prevent the pressure build up between the inner end of the shaft 24 and the adjacent end of the sleeve 41, sufficient clearance is provided between these parts so that there is leakage between these parts which permits cabin pressure to be present in said space between the inner end of the shaft and the adjacent end of the sleeve.

The body of the valve 10 includes an annular part 47 spaced axially from the base 12 and connected there to by means of a plurality of annularly spaced structures 48. The annular part 47 has a shoulder 49 in which is formed a recess for reception of a peripheral bead 50 of the upper diaphragm 51 which connects the portion 47 with the valve member 14 and cover 34. The diaphragm 51 has an inner peripheral portion 52 clamped between the upper side of the bottom wall of cap 34 and an annular ring 53, these parts being secured together by any suitable means such as the annularly spaced rivets 54. The peripheral bead 50 of the diaphragm 51 is secured in place by an annular ring 56 having a recess 57 for reception of the free end portion of a flange 58 of a cover 59. The cover 59 includes a bottom wall 60 and has the outwardly projecting frusto-conical-shaped hollow projection 61. The cover 59, diaphragm 51 and cap 34 define a chamber 65 for a valve operating pressure and the diaphragm 51 and cap 34 may be termed a pressure sensitive control element. This pressure sensitive control element is subjected on one side to the operating pressure in chamber 65 and on the opposite side to pressure within the enclosure or cabin.

Means for urging the valve member in the closing direction comprises a light spring 66 disposed about the sleeve 41 and reacts between the cap 34 and the outer end wall 67 of the projecting part 61, said wall 67 having an axial opening 68 therein to provide connecting means with a source of control pressure shown as the control pressure chamber 70 of the regulator 11. As the registered openings 68, 89 and 92 are of larger diameter than the outside diameter of the sleeve 41, said sleeve may pass through said openings when the main valve is actuated.

Regulator 11 may be of any suitable type but, as shown comprises a base 75 having a cup-shaped cover 76 within which may be housed various suitable pressure control means. The control pressure chamber 70 has an inlet connection from a source of higher pressure such as the enclosure or cabin, said inlet connection not being shown herein. There is also outlet means for the control chamber controlled by said pressure control means. As shown in Fig. 2, these pressure control means comprise an isobaric control mechanism 77, low differential control mechanism 78, a high differential control mechanism 79 and a rate control 80. The bottom wall 82 of the cover 76 is provided with an opening 83 of larger diameter than the diameter of the outer end of projecting part 61 and the wall 67 of the projecting part 61 and bottom wall 82 of the regulator 11 are connected together by flexible means shown as a diaphragm 85 which is annular in shape and has the outer peripheral edge portion thereof clamped to the wall 82, about opening 83, by means of an annular ring 86 and rivets 87. Diaphragm 85 has a central opening 89 which registers with the opening 68 in the wall 67 and the inner edge portion of the diaphragm surrounding said opening 89 is clamped to the wall 67, there being an annular washer 90 on the side of the diaphragm 85 opposite the wall 67 which is secured to said wall 67 by means of rivets 91 or by an other suitable means. It is to be noted that the central opening 92 of the washer 90 is also aligned with the openings 68 and 89 of the wall 67 and diaphragm 85 respectively.

The regulator unit 11 is secured to the outflow valve 10 by means of a plurality of shock or vibration absorbing mountings, indicated generally at 100. These mountings are annularly spaced and inasmuch as they are all of the same construction, a description of only one will be made. There is a plurality of peripherally positioned annularly spaced tabs 101 secured to the member 56 of the cover assembly by brazing or other suitable means, said tabs having end portions 102 that are turned angularly toward the regulator unit 11 and which are annular in shape. The regulator unit is also provided with a corresponding number of tabs 103 which are brazed, or otherwise suitably secured, to the bottom 82 of the regulator cover 76 and have end portions 104 turned toward the outflow valve. The end portions 104 of the tabs 103 are in planes spaced inwardly of the planes of the end portions 102 of the tabs 101. Resilient connecting means comprises a resilient washer 105 having a central boss 106 which extends axially and which is provided with an axial opening therethrough for reception of a screw 107 secured in position by a nut 108, there being a washer 109 beneath the head 110 of the screw 107. A peripheral portion 112 is secured to the annular tab 102 by means of a plurality of rivets 113 which are annularly spaced apart. In the arrangement shown herein, there are four of the mountings 100 arranged in diametrically opposed pairs. It is to be understood, however, that any suitable number of such mountings may be used. The mountings 100 serve to support the regulator unit 11 on the valve 10 which is fixedly secured to the cabin wall or the like and said mountings 100 serve to absorb vibration or shocks which might otherwise be transmitted to the regulator unit 11. The means connecting the bottom 82 of the regulator cover 76 with the extended portion 61 of the outflow valve provides a flexible connection through which the pressure in the control pressure chamber 70 of the regulator unit 11 is transmitted to the chamber 65 so that the outflow valve is controlled in accordance with the pressure in the control chamber 70.

The diaphragm 85 is in generally axial association with the outflow valve 10 and the regulator unit 11 and the axes of the shock absorbing mountings 100 are substantially normal to the axis of said diaphragm.

I claim:

1. In apparatus of the class described, the combination of an outflow valve unit having a pressure chamber with an axial extension having an end wall with an opening therein; a separate regulator unit axially arranged with respect to the outflow valve and spaced from the end thereof having the chamber, said regulator unit having a control pressure chamber defined by wall means, the wall means adjacent the outflow valve having an axial opening; flexible wall means closing said opening and having a central opening therethrough, said flexible wall means being connected to said extension of the outflow valve and registering with the opening in the end wall thereof; and a plurality of peripherally arranged diametrically opposed shock absorbing mountings, each including a flexible member having an axis substantially normal to the axis of the flexible wall means, means peripherally secured to said flexible member and attached to one of said units, and means securing a central portion of said flexible member to the other of said units, said last mentioned means having a part arranged axially with respect to said flexible member with the axis of said part substantially normal to the axis of said flexible wall means.

2. In apparatus of the class described, the combination of an outflow valve unit having a pressure chamber with an axial extension having an end wall with an opening therein; a regulator unit axially arranged with respect to the outflow valve and spaced from the end thereof having the chamber, said regulator unit having a control pressure chamber defined by wall means, the wall means adjacent the outflow valve having an axial opening; flexible wall means closing said opening and having a central opening therethrough, said flexible wall means being connected to said extension of the outflow valve and registering with the opening in the end wall thereof; and a plurality of peripherally arranged diametrically opposed shock absorbing mountings, each including a flexible member, means peripherally secured to said flexible member and attached to one of said units, and means securing the central portion of said flexible member to the other of said units.

3. In apparatus of the class described, the combination of an outflow valve unit having a pressure chamber with an extension, said extension having an end wall with an opening therein; a regulator unit having a pressure chamber defined by wall means, said pressure chamber being located adjacent said extension and the wall means of said chamber having an opening of larger size than said end wall, and aligned with the opening in said extension; a flexible element secured in the opening of said regulator pressure chamber and connected to said extension of the outflow valve chamber, there being an opening in said flexible element registering with the opening in the end wall of said extension to provide communication between the pressure chambers; and a plurality of peripherally arranged shock absorbing mountings connecting said units together, each of said mountings including a flexible member, means peripherally secured to said flexible member and attached to one of said units, and means securing the central portion of said flexible member to the other of said units.

4. In apparatus of the class described, the combination of an outflow valve unit including a pressure chamber with an outwardly projecting portion having an end wall with an opening therein; a regulator unit having a control pressure chamber defined by wall means provided with an opening aligned with the opening in said end wall; flexible wall means extending between said end wall and the wall portion about the opening in the wall means of said control pressure chamber, said flexible wall means having an opening therein providing fluid communication between said chambers; and a plurality of peripherally arranged diametrically opposed shock absorbing mountings, each including a flexible member, means peripherally secured to said flexible member and attached to one of said units, and means securing the central portion of said flexible member to the other of said units.

5. In apparatus of the class described, the combination of an outflow valve unit including walls defining a pressure chamber; a regulator unit including walls defining a control pressure chamber, one of said chambers having an extension with a perforate end wall, flexible wall means between said end wall, and a wall of the other chamber, said flexible wall means having an opening therein providing communication between said chambers; and a plurality of peripherally arranged shock absorbing mountings, each including a flexible member, means peripherally secured to said flexible member and attached to one of said units, and means securing the central portion of said flexible member to the other of said units.

6. In apparatus of the class described: regulator mechanism including wall means defining a control pressure chamber; valve mechanism including walls defining a pressure chamber; a flexible planar element connected to the wall means of the respective chambers and having an opening therein providing fluid communication between said chamber, said flexible element being adapted to have greater lateral flexibility than flexibility in the plane thereof; and a plurality of resilient mounting means connecting the mechanisms together and having greater flexibility in a direction generally parallel to the plane of said flexible element and having more limited flexibility in a direction normal to said plane.

7. In apparatus of the class described, the combination of an outflow valve unit having a pressure chamber with an outward extension, said extension having an end wall with an opening therein; a separate regulator unit having walls defining a control pressure chamber; one of the walls of the control pressure chamber having an opening therein aligned with the opening in said extension, the wall of the control pressure chamber having an opening being adjacent the wall of said extension provided with an opening; flexible wall means in the opening in the wall of the control pressure chamber, said flexible wall having a central opening therethrough and being connected to the extension of the pressure chamber of the outflow valve, the opening in the flexible wall being in register with the opening of the end wall of said outflow valve pressure chamber; a plurality of shock absorbing mountings connecting the outflow valve unit and regulator unit together; a movable valve member for said outflow valve unit; a fixed guide for said valve member; and a movable guide member connected to said valve member and aligned with the opening in said extension and the opening in said flexible wall means.

References Cited in the file of this patent

UNITED STATES PATENTS

| 1,056,867 | Weld | Mar. 25, 1913 |
| 2,030,565 | Bilde | Feb. 11, 1936 |
| 2,076,699 | Brown | Apr. 13, 1937 |
| 2,233,102 | Kucher | Feb. 25, 1941 |
| 2,262,823 | Stearns | Nov. 18, 1941 |
| 2,352,591 | Wallerstein | June 27, 1944 |
| 2,436,183 | Snedecor | Feb. 17, 1948 |
| 2,485,113 | Roth et al. | Oct. 18, 1949 |

FOREIGN PATENTS

| 991,709 | France | June 21, 1951 |